Nov. 19, 1929.   C. C. FUERST   1,736,436
REMOVABLE OBJECTIVE MOUNT FOR PHOTOGRAPHIC CAMERAS
Filed Oct. 17, 1928
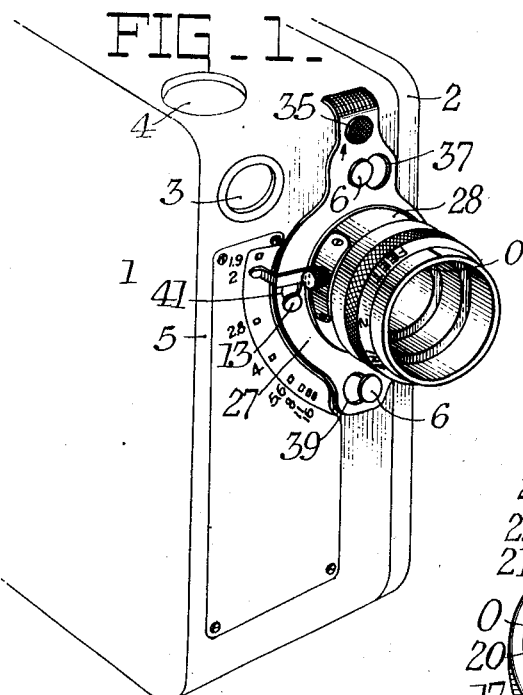
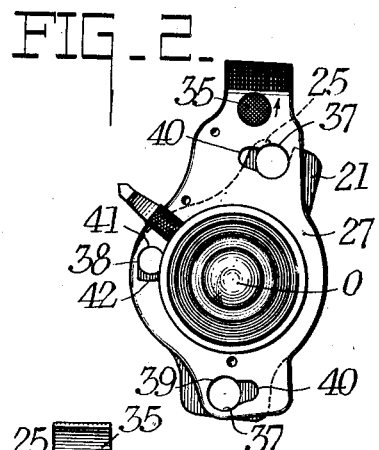
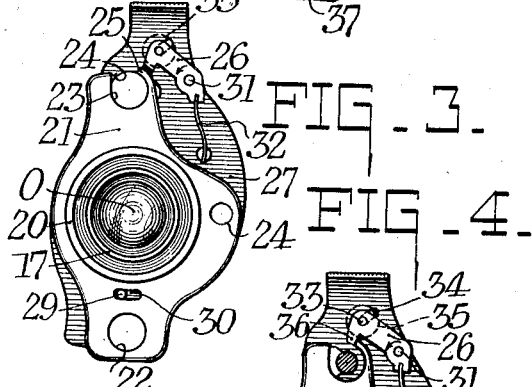
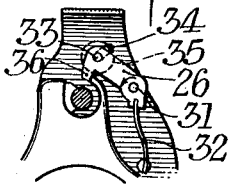
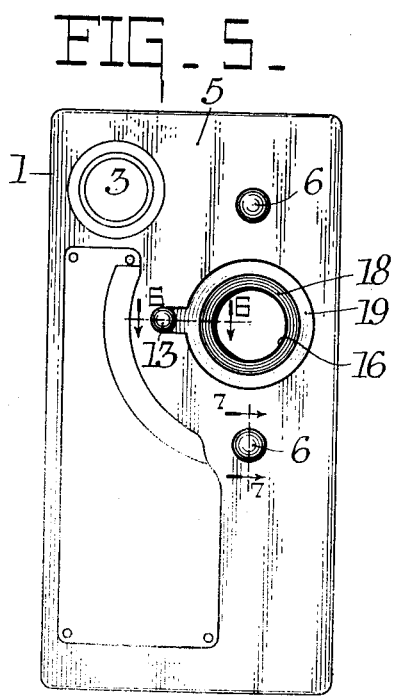
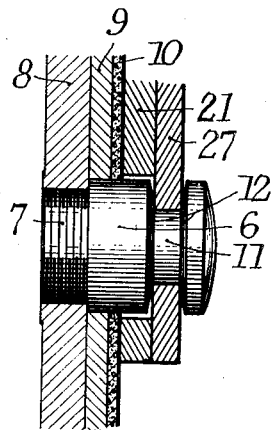
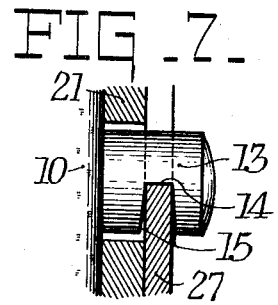
Inventor,
Carl C. Fuerst,
By [signatures]
Attorneys Patented Nov. 19, 1929

1,736,436

UNITED STATES PATENT OFFICE

CARL C. FUERST, OF ROCHESTER, NEW YORK, ASSIGNOR TO EASTMAN KODAK COMPANY, OF ROCHESTER, NEW YORK, A CORPORATION OF NEW YORK

REMOVABLE OBJECTIVE MOUNT FOR PHOTOGRAPHIC CAMERAS

Application filed October 17, 1928. Serial No. 313,115.

This invention relates to photography and more particularly to a removable connection between an objective and photographic apparatus, such as cameras or projectors.

One object of my invention is to provide an objective mount which can be readily placed on and removed from a photographic camera. Another object is to provide a mount which will hold an objective readily in the proper position on the camera with the lens axis at right angles to the film gate. Another object is to provide a simple form of locking mechanism by which the objective may be held in place and which may be easily released for removing the objective. Another object is to provide an accurate support for the objective mount which extends beyond the usual leather covering of a camera and which is engaged by a base plate carrying the objective, and other objects will appear in the following specification, the novel features being particularly pointed out in the claims at the end thereof.

Coming now to the drawings wherein like reference characters denote like parts throughout:

Fig. 1 is a perspective view showing a camera equipped with an objective carried by a removable mount constructed in accordance with and embodying a preferred form of my invention.

Fig. 2 is a front plan view of the objective and mount removed from a camera.

Fig. 3 is a rear plan view of the parts shown in Fig. 2.

Fig. 4 is a fragmentary detail showing the latch in position to hold the objective on the camera.

Fig. 5 is a front plan view of a camera equipped to receive the removable mount shown in the preceding figures.

Fig. 6 is a greatly enlarged fragmentary detail in section on line 6—6 of Fig. 5, and Fig. 7 gives a similarly enlarged detail on line 7—7 of Fig. 5.

With the amateur motion picture cameras which are now in use, it is possible to buy a series of lenses of different focal lengths which are generally used for different purposes. While my present invention relates primarily to providing a satisfactory removable mount for such cameras, it is obvious that other types of cameras as well as projectors could readily be equipped with a removable mount of the type which will be more fully hereinafter described.

As shown in Fig. 1, a typical motion picture camera 1 may have the usual removable door 2 through which film may be loaded into the camera. There may be a finder lens 3 in the front of a viewing lens 4 in the top.

On the front wall 5 of the camera, as best shown in Fig. 5, in accordance with my invention a plurality of studs are mounted. In the present case there are two similar studs 6 which, as shown in Fig. 6 may be screwed into at 7 a heavy plate 8 which lies inside the camera wall 9 which is preferably covered with a decorative coating of leather 10 or similar material. The studs 6 project from the leather covering 10 and are provided with grooves 11 which have bevelled walls 12.

I also provide a stud 13, which, as best shown in Fig. 7, comprises a post which may be mounted similarly to the studs 6 and which is provided with a slot 14 having tapering walls 15. The stud and this post comprise the support for the removable objective mount which will be hereinafter described. The front wall 5 of the camera is provided with an opening 16 through which the rear lens cell 17 may project, although with some objectives the lens cell will not extend far enough back to actually project through this opening.

Around the opening 16, there are two flanges 18 and 19, the latter flange being cut through the leather 10 and the metal wall 9 of the camera to form a seat on the heavy plate 8 for receiving an annular member 20, this being shown in Fig. 3. The seat 20 is integral with a base plate 21 and may be interiorly threaded to receive an objective indicated broadly as O.

The manner of applying the objective to this base plate is not important so long as the objective is rigidly supported thereon.

The base plate 21 is provided with a lower aperture 22 and upper aperture 23 and a side aperture 24, the diameter of these apertures being sufficient to pass freely over the studs 6 and the post 13.

It should be noted that the upper aperture 23 has its top cut away at 24, thus leaving a curved arm 25 on one side. This arm constitutes a lug against which a latch 26 may operate as will be later described.

A latch plate 27 is pivotally mounted with respect to the base plate 21 by encircling and freely turning upon the barrel 28 of the objective O. The possible relative movement between the base and latch plates is limited by a pin 29 carried by the latch plate 27 and extending upwardly through an arcuate slot 30 in the base plate 21.

By swinging the latch plate 27 with respect to the base member 21 from the position shown in Fig. 3 to the position shown in Fig. 4, the latch member 26 will be brought into engagement with the lug 25 and will thus hold the parts in the position shown in Fig. 1 in which they are latched firmly together. Latch 26 is pivoted on a stud 31 and is thrust by a spring 32 in the direction indicated by the arrow. It also carries a stud 33 passing through an arcuate slot 34 and terminating in a push button 35 on the outside wall of the latch plate 27. To release the latch 26, the push button is thrust in the direction shown by the arrow (Fig. 1), thereby disengaging the nose 36 from the lug 25 and permitting the latch plate to be turned.

In order to firmly hold the objective upon the camera, the following arrangement is used: The latch plate 27 is provided with a series of openings; the upper and lower openings 37 and side opening 38. The openings 37 are of irregular shape, having a large diameter at 39 from which extends a smaller sized opening 40. The opening 38 is rounded at the top 41 and is provided with a substantially straight side 42. These openings, with the pins 6 and 13, form a bayonet latch.

With the parts in the position shown in Fig. 2, the objective and mount are placed on the camera by passing the studs 6 through openings 37 and post 13 through the opening 38. The latch plate 27 is then turned to the right, thereby causing portions 40 of openings 37 and portion 42 of opening 38 to enter the grooves 11 of stud 6 and 14 of post 13.. As above described the slots in these parts all have bevelled walls, so that as the latch plate 27 is turned, it is firmly cammed into the proper position and the annular ring 20 is pressed firmly in its seat 19.

By turning latch plate 27 to its limit of movement, latch 26 will snap into engagement with lug 25 and the parts will be firmly held in operative position. It is only necessary to push up button 35 to release the latch so that the latch plate may be turned to the left (Fig. 1) to permit the removal of the objective.

It should be noted that, while the apertures 37 and 38 in plate 27 are of irregular shape, parts of these apertures register with apertures 22, 23 and 24 of the base plate 21 when the parts are in the position shown in Fig. 2. When, however, the latch plate 27 is turned in the base, the restricted parts of these apertures form a bayonet lock and edges 40 and 42 come in contact with the bevelled walls 12 and 15 by which they are guided firmly into place.

The latch plate 27 actually locks the attachment to the camera and the latch 26 then locks the latch plate in such a way that it cannot move on the base plate; this double locking movement effectually preventing accidental displacement of the lens attachment.

Having thus described my invention, what I claim as new and desire to secure by Letters Patent is:

1. In a lens mount for photographic cameras, the combination with a support, a base plate, a bayonet latch for holding the base plate on the support including studs on the support, and a latch plate carried by the base plate, said latch plate being movable relative to the base plate, and a latch between the latch plate and base plate adapted to hold these parts together.

2. In a lens mount for photographic cameras, the combination with a support, a base plate, a bayonet latch for holding the base plate on the support including studs on the support and a latching plate pivotally attached to the base plate, a spring catch for holding the latching plate in a fixed position relative to the base plate, and means for manually releasing the spring catch.

3. In a lens mount for photographic cameras, the combination with a support, a base plate, a bayonet latch for holding the base plate on the support including slotted studs on the support, a base plate, means for holding the base plate on the studs comprising a latch plate movably mounted on said base plate and adapted to engage the slots in the studs, and a catch for holding said latch plate in an operative position in which said plate is in engagement with said slots.

4. In a lens mount for photographic apparatus, the combination with a support and slotted studs on the support, of a removable lens mount including a base plate having apertures therein adapted to encircle said studs, an objective carried by the base plate, a latch plate movably mounted with respect to the base plate and having apertures spaced similarly to the aperture of the base plate, said apertures having also an irregular opening extending from said registering apertures, whereby the removable lens mount may be placed on the apparatus by passing the apertures of the base plate and latch plate over the studs and then turning said latch plate to engage the slotted studs.

5. In a lens mount for photographic apparatus, the combination with a support and slotted studs on the support, of a removable lens mount including a base plate having apertures therein adapted to encircle said studs, an objective carried by the base plate, a latch plate movably mounted with respect to the base plate and having apertures spaced similarly to the aperture of the base plate, said apertures having also an iregular opening extending from said registering apertures, a latch on the latch plate to hold the plate in a predetermined position with respect to the base plate whereby the lens mount may be locked on photographic apparatus by registering the apertures of the base plate and latch plate, passing the studs through the registered apertures and turning the latch plate on the base plate to engage the slotted studs.

6. In a removable lens attachment for photographic apparatus, the combination with a support having a seat therein, a flanged base plate adapted to engage and be located by the seat in the support, an objective carried by the base plate, and means for holding the base plate positioned in the seat including cooperating pins and slots on the support and the base plate forming a bayonet latch between the parts.

7. In a removable lens attachment for photographic apparatus, the combination with a support having a seat therein, a base plate, a flange formed on the base plate said flange being adapted to engage and be located by the seat in the support, an objective carried by the base plate and means for removably attaching the base with the flange located in the seat including cooperating pins and slots on the support and base plate and means for retaining the pins in the slots.

8. In a removable lens attachment for photographic aparatus, the combination with a support having a seat therein, a flanged base plate adapted to engage and be located by the seat, an objective carried by the base plate, a latch plate movably mounted on the base plate, and means for holding the flanged base plate against the seat of the support including a bayonet latch consisting of cooperating pins and slots on the support and base plate. Said pins being adapted to be held in said slots by said latch plate.

Signed at Rochester, New York this 11th day of October 1928.

CARL C. FUERST.